United States Patent
Yamawaki et al.

[15] 3,674,759
[45] July 4, 1972

[54] PROCESS OF POLYMERIZING CONJUGATED DIENES AND CATALYST

[72] Inventors: Takeshi Yamawaki; Masakatsu Usami; Tetsumi Suzuki; Takao Uematsu, all of Tokyo-to, Japan

[73] Assignee: Mitsubishi Kasei Kogyo Kabushiki Kaisha, Tokyo-to, Japan

[22] Filed: March 10, 1970

[21] Appl. No.: 18,338

[30] Foreign Application Priority Data

March 20, 1969 Japan..................................44/21390

[52] U.S. Cl..........................260/82.1, 252/429 B, 260/84.1, 260/94.3
[51] Int. Cl......................C08d 1/14, C08d 3/04, C08d 3/06
[58] Field of Search ..............................260/94.3, 84.1, 82.1; 252/429 B

[56] References Cited

UNITED STATES PATENTS

| | | | |
|---|---|---|---|
| 3,215,682 | 11/1965 | Farrar et al. | 260/94.3 |
| 3,251,815 | 5/1966 | Yamada et al. | 260/82.1 |
| 3,476,721 | 11/1969 | Binder et al. | 260/82.1 |
| 3,484,425 | 12/1969 | Yamawaki et al. | 260/94.3 |
| 3,431,248 | 3/1969 | Kanbara et al. | 260/94.3 |
| 3,577,396 | 5/1971 | Throckmorton | 260/82.1 |

FOREIGN PATENTS OR APPLICATIONS 1,027,959   5/1966   Great Britain......................260/94.3

*Primary Examiner*—Joseph L. Schofer
*Assistant Examiner*—Richard A. Gaither
*Attorney*—Wenderoth, Lind & Ponack

[57] ABSTRACT

In polymerizing a conjugated diene use is made of a catalyst consisting of tetrafluoroborate of nickel or cobalt or a complex compound of the tetrafluoroborate and an organometallic compound of a metal of group 2 or 3 of the periodic table.

19 Claims, No Drawings

PROCESS OF POLYMERIZING CONJUGATED DIENES AND CATALYST

BACKGROUND OF THE INVENTION

This invention relates to a process of polymerizing a conjugated diene either alone or in admixture with each other or with other polymerizable hydrocarbons and more partialarly to a process of polymerizing a conjugated diene in the presence of a novel polymerization catalyst of the nickel or cobalt series.

Polybutadiene produced from 1,3-butadiene is useful in automobile tires because of its resilience, abrasion resistance, low heat build up and good thermal stability. Particularly, a polybutadiene containing a high percentage of polymer having a cis-1,4-structure is superior in thermal and mechanical properties. Prior to this invention, it has been found that butadiene can be polymerized by various catalyst combinations of transition metal salts and organometallic compounds.

It has also found that catalyst systems having particular transition metal components result in polymers essentially consisting of cis-1,4-polybutadiene. When titanium is selected as transition metal component, it is necessary to combine iodine with titanium, but the cis-1,4-content attained by using this catalyst never exceeds about 95 percent, and moreover it is not economical to use such a particular salt. When cobalt or nickel is selected as the transition metal, a three-component catalyst consisting of naphthenate of cobalt or nickel, alkyl aluminum compound and $BF_3$ has been proposed and a high cis-1,4-content of about 95–98 percent was attained with this catalyst, but it has no catalytic activity if $BF_3$ is omitted, the use of which makes the catalyst preparation somewhat complicated and is not advantageous from the industrial point of view. A cobalt chloride-containing catalyst was also proposed, in which the organo-metallic compounds to be combined with cobalt chloride are limited only to a few particular compounds, that is, when aluminum trialkyl is combined therewith, the polymer obtained has 1,2-syndiotactic structure without aging of the catalyst.

SUMMARY OF THE INVENTION

Accordingly, it is an object of this invention to provide a novel process of polymerizing conjugated dienes.

Another object of this invention is to provide a novel polymerization catalyst for polymerizing conjugated dienes which is easy to prepare and manifests high polymerization activity even at relatively low temperatures.

The invention is characterized by the use of a binary catalyst comprising tetrafluoroborate of nickel or cobalt as one of its composition in the polymerization of conjugated dienes. In the case of butadiene, tetrafluoroborate of nickel is particularly advantageous because of its high cis-1,4-content, and of its ability of yielding polymers of high workability.

In the preferred form, the catalyst of this invention comprises at least one compound selected from the group consisting of tetra-fluoroborate of nickel or cobalt and complex compounds of the tetrafluoroborate and an organometallic compound of a metal selected from the metals of groups 2 and 3 of the periodic table.

The tetrafluoroborate of nickel or cobalt comprising one of the components of the novel polymerization catalyst may be a divalent or trivalent salt but the former is preferred because it is more easily available and is more stable. These tetrafluoroborates may range from hexahydrate to substantially anhydrous. Any one of many organic or inorganic complex compounds of the tetrafluoroborate may be used. Thus, for example, a portion or all of the water of crystallization of the hexahydrate of the tetrafluoroborate may be substituted by one or more members selected from the group consisting of compounds containing alcohol, carboxylic acid, amine, amide or other compounds containing active hydrogen. Thus such complex compounds of the tetrafluoroborates may be expressed by a general formula $$M(BF_4)_2 \cdot 6X$$

where M is a member selected from the group consisting of nickel and cobalt and X is a member selected from the group consisting of ROH, RCOOH, where R represents an alkyl radical having one to 20 carbon atoms, phenols, amines, amides and compounds containing active hydrogen. Among compounds that can substitute for the water of crystallization may be mentioned, for example, alcohols such as methyl alcohol, ethyl alcohol, propyl alcohol, isopropyl alcohol, butyl alcohol, isobutyl alcohol, neopentyl alcohol, amyl alcohol, allyl alcohol, cyclohexanol, cyclohexenyl alcohol, methyl cyclo-hexanol and chloropropyl alcohol; phenols such as phenol, cresol and chlorophenol; carboxylic acids such as formic acid, acetic acid, propionic acid, acrylic acid, isobutyric acid, butyric acid, lauric acid, cyclohexane carboxylic acid, methyl cyclohexane carboxylic acid, benzoic acid, trichloroacetic acid, dichloroacetic acid, monochloroacetic acid, trifluoroacetic acid, chlorobenzoic acid; amines such as methyl amine, ethyl amine, diethyl amine, triethyl amine, ethanol amine, pyridine and aniline; amides such as aceto amide, urea, aceto anilide, propion anilide, and compounds containing active hydrogen such as acetyl-acetone, ethyl malonate, ethyl acetoacetate, malonic acid dinitrile.

Compounds that replace the water of crystallization may also be inorganic compounds such as ammonia, boric acid and the like. Substitution by such a compound may be performed by reacting it with anhydrous acetic acid where the compound is substituted for acetic acid, for example, according to a conventional process. By the suitable selection of the compound that replaces the water of crystallization it is possible to render the tetrafluoroborate of nickel or cobalt soluble in hydrocarbon solvents. When rendered soluble, incorporation of the catalyst becomes easier and the activity of the catalyst is improved, thus reducing the quantity of the catalyst used. In this invention, one or more of the members selected from the tetrafluoroborates and organic or inorganic complex compounds thereof constitute the first component of the catalyst.

Another component of the catalyst of this invention is an organometallic compound of a metal of group 2 or 3 of the periodic table and includes organometallic compounds of various metals such as aluminum, boron, zinc, magnesium, cadmium, for example dialkyl magnesium, alkyl magnesium halide, trialkyl aluminum, dialkyl aluminum halide, alkyl aluminum sesguihalide, alkyl aluminum dihalide, dialkyl zinc, etc. Although alkyl radicals containing 1 to 20 carbon atoms are preferred a portion or all of the alkyl radicals may be replaced by cycloalkyl radicals or aryl groups or a portion of the alkyl radicals may be replaced by hydrogen. Chlorine, bromine and iodine may be used as the halogen.

The most preferred organometallic compounds are alkyl aluminum compounds and alkyl zinc compounds of the formula $R_mMY_n$ wherein R is an alkyl radical having one to 20 carbon atoms, M is zinc or aluminum, Y is chlorine, bromine or iodine, $m$ is 1 to 3, $n$ is 0 to 2, and $m + n$ is 2 or 3. Compounds found to be particularly effective are triethyl aluminum, trisobutyl aluminum, trihexyl aluminum, trioctyl aluminum, tridecyl aluminum, trisopropyl aluminum, diethyl aluminum chloride, ethyl aluminum sesquichloride, monoethyl aluminum dichloride, diethyl zinc, etc.

It is to be understood that, in carrying out the process of this invention organomethallic compounds of the metals of groups 2 and 3 of the periodic table may be used singly or in combination. Thus, for example, a mixture of triethyl aluminum and diethyl aluminum chloride or a mixture of diethyl aluminum chloride and monoethyl aluminum dichloride may also be used.

It is also to be noted that the organometallic compounds of the metals of groups 2 and 3 of the periodic table may include hydrides and chlorides of these metals.

According to this invention the polymerization catalyst is prepared from above described two components. While such preparation may be made under solventless condition, normally the two components are admixed in a suitable one of various reaction solvents described later. In this regard, there is no limitation on the order of incorporation of respective components. For example, in one process the solvent is incorporated with tetrafluoroborate of nickel or cobalt and or a complex compound thereof (hereinafter, merely termed as the "tetrafluoroborate of nickel or cobalt") and then above described organic metal compound is added to the mixture while in another process the organometallic compound is first incorporated into the solvent and then the tetrafluoroborate of nickel or cobalt is added to the mixture. The presence of the raw material conjugated diene at the time of preparing the catalyst not only greatly inproves the activity of the catalyst but also decreases the quantity of gel in the polymer obtained. Accordingly, it is possible to first incorporate the organometallic compound in a mixture of the solvent and the tetrafluoroborate of nickel or cobalt and then add the organometallic compound so as to immediately commence the reaction or to reverse the order of incorporation of the components of the catalyst. Although the ratio of catalyst components may vary over a considerably wide range the molar ratio ranging from 0.01 to 2,000, preferably 0.2 to 1,000 of the tetrafluoroborate of nickel or cobalt and the organometallic compound of the metal of group 2 or 3 of the periodic table are generally preferred.

Although, the conditions for the preparation of the catalyst, e.g. temperature, atmosphere and solvent are not critical where the catalyst is prepared in the presence of the raw material, conjugated diene, to cause immediate reaction such conditions are required to be the same as the reaction conditions of the conjugated diene. However, where the catalyst is prepared beforehand, it is desirable that the conditions of the preparation of the catalyst should be as close as possible to the polymerization conditions of the conjugated diene. Usually, the catalyst is prepared at a temperature close to normal temperature by utilizing a portion or all of the solvent for the polymerization reaction and in the presence of a dry inert gaseous atmosphere such as nitrogen or argon.

The catalyst prepared in this manner can be utilized for effecting the polymerization reaction without aging but with its quantity adjusted, if required, where the catalyst is prepared in this manner and it happens to contain a solid insoluble in the solvent. Although the catalyst containing the solid can be used for the reaction, such solid may be removed by filtration or the like.

The conjugated diene polymerized by the process of this invention may be a butadiene-1, 3 hydrocarbon such as 1,3-butadiene, methyl substituted butadiene-1,3 or isoprene or piperylene; or a conjugated aliphatic diolefine containing more than five carbon atoms, such as 2,3-dimethyl butadiene-1,3, 2-ethyl-butadiene-1,3,hexadiene-2,4, etc.; or a conjugated cyclic diolefine hydrocarbon such as cyclopentadiene, cyclohexadiene -1,3. Mixtures of two, three or more of these conjugated dienes can be used. According to this invention the conjugated diene may be copolymerized with another monomeric hydrocarbon material, vinyl substituted aromatic hydrocarbon such as styrene, for example.

The polymerization reaction of the conjugated diene according to this invention is carried out under normal pressure or an elevated pressure in the presence or absence of a solvent inert for the reaction, for example, aromatic hydrocarbons such as benzene, toluene and xylene; aliphatic hydrocarbons such as n-hexane and n-heptane; aliphatic cyclohydrocarbons such as cyclohexane and methylcyclohexane; and hydrocarbon mixtures such as petroleum ether and ligroin. Although the temperature of the polymerization reaction may be any temperature that can maintain the solvent in the liquid state, a temperature ranging from −20° to 150° C., preferably from 0° to 60° C. is generally advantageous. Although even a very small quantity of the catalyst is sufficiently effective or active for the polymerization reaction, preferred molar ratio of the conjugated diene and the tetrafluoroborate of nickel or cobalt is from $10^{-4}$ to 0.5, preferably from $10^{-3}$ to $10^{-1}$.

When polymerizing the conjugated diene with the catalyst described above, a well known molecule weight control reagent such as vinyl cycloolefine, $\alpha$-olefine and the like may be present in the system so as to control the molecular weight of the resulted polymer to a desired value. These molecular weight control reagents include 1-butane, 1-vinyl cyclohexene-3, 1,3-dimethyl-1-vinyl cyclo-hexane, 1-vinyl cyclopentene-3, 1-vinyl cyclobutene-2, limone, 3-5-diethyl-1-vinyl cyclopentene-2, etc. 1-vinyl cyclohexene-3 is especially suitable because it can be readily obtained as a Dicls-Alder reaction product of butadiene-1,3 and it does not affect the characteristics of the resulted polymer. Although the quantity of such a molecular weight control reagent used varies dependent upon the desired molecular weight of the resulted polymer, where vinyl cycloolefine is selected its quantity may be up to 20 percent, by weight, for example. It may vary within a range from a very small quantity of about 0.001 percent, by weight, to 10 percent, by weight. Further, although the time of incorporation of the vinyl cycloolefine is not critical it may be incorporated into the polymerization system prior to or immediately after commencement of the polymerization reaction.

The resulting polymerization reaction product is treated according to the conventional process to obtain polymerized conjugated diene. This may be effected by distilling off the solvent from the reaction product or by adding a poor solvent such as alcohol or ketone to precipitate the polymerized conjugated diene.

The following examples are given by way of illustration, and are not to be construed as limiting in any way the scope and spirit of the invention.

EXAMPLE 1

100 *ml* of dehydrated toluene and 1.19 millimols of crystalline Ni $(BF_4)_2 \cdot 6H_2O$ prepared by concentrating a 40 percent aqueous solution of commercial tetrafluoroborate of nickel were charged in a pressure tight glass bottle of 340 ml. 2 millimole of triisobutyl aluminum in a stream of inert gas, e.g. nitrogen or argon was added to the mixture. Then, 0.44 mol of 1,3-butadiene was charged and the bottle was sealed. The bottle was rotated in a water bath maintained at 20° C. for 100 hours to effect the polymerization reaction. After completion of the reaction the content of the bottle was poured into a mixture of methanol and toluene containing 2 percent of ionol (3,5-ditertiary-butyl hydroxytoluene) acting as an anti-oxidant, to precipitate rubbery polybutadiene. After drying under reduced pressure at a temperature of 50° C. a polymer was obtained at a yield of 26 percent. The microstructure of the polymer was determined to contain 96.8 percent of cis-1,4, 0.1 percent of trans-1,4 and 3.1 percent of vinyl by an infrared absorption spectroscopy (i.e. the Morero method, see La Chimica e Industria, 41, pp 758–762, (1959) ). The intrinsic viscosity [$\eta$] in toluene was 1.7.

EXAMPLE 2

In this example 1.31 millimols of commercially available crystalline tetrafluoroborate of cobalt Co $(BF_4)_2 \cdot 6H_2O$ and 2 millimols of triisobutyl aluminum were used. Other conditions were the same as in example 1. The polymerization reaction was carried out at a temperature of 20° C. for 48 hours at a yield of 20 percent. The micro structure of the polymer was: 52.5 percent of cis-1,4, 4.9 percent of trans −1,4 and 42.6 percent of vinyl. The intrinsic viscosity [$\eta$] in toluene was 2.5.

EXAMPLES 3–22

Polymerization reaction was carried out in the same manner as in example 1 for various combinations of nickel complex, organoaluminums, 1,3-butadiene and solvents in various quantities and for various reaction times and reaction temperatures as shown in table 1. Yield of the polymers, micro structure of the products, and the intrinsic viscosity [$\eta$] in toluene are also included in this table.

TABLE 1

| | Ni(BF$_4$)$_2$·6X | | Organo aluminum compound | | 1,3-butadiene | | Solvent | | Reaction temperature, °C | Reaction time, hrs. | Yield, percent | Microstructure of the product, percent | | | |
|---|---|---|---|---|---|---|---|---|---|---|---|---|---|---|---|
| | Type of X | Quantity used, millimol | Type | Quantity used, millimol | Quantity added ①, millimol | Quantity added ②, mol | Type | Quantity used, ml. | | | | Cis | Trans | Vinyl | [η] |
| 3 | CH$_3$OH | 0.38 | Triisobutyl aluminum | 0.5 | 0 | 0.44 | Toluene | 100 | 20 | 16 | 83 | 97.9 | 0.1 | 2.0 | 1.7 |
| 4 | C$_2$H$_4$OH | 0.33 | ...do... | 1.0 | 1.7 | 2.0 | ...do... | 280 | 20 | 3 | 55 | 99.6 | 0.1 | 0.3 | 2.9 |
| 5* | Isobutyl alcohol | 0.30 | ...do... | 1.9 | 1.5 | 2.0 | ...do... | 280 | 20 | 2.5 | 62 | 99.6 | 0.1 | 0.3 | 3.0 |
| 6 | CH$_3$COOH | 0.36 | ...do... | 1.3 | 0 | 0.44 | ...do... | 100 | 20 | 11 | 20 | 98.6 | 0.3 | 1.1 | 2.3 |
| 7 | CCl$_3$COOH | 0.15 | ...do... | 0.55 | 0 | 0.44 | ...do... | 100 | 20 | 31 | 53 | 86.1 | 13.2 | 0.7 | 0.4 |
| 8 | Lauric acid | 0.1 | ...do... | 0.35 | 0.5 | 0.5 | ...do... | 100 | 20 | 149 | 81.4 | 81.3 | 17.6 | 1.1 | 0.4 |
| 9 | Acetyl acetone | 0.17 | ...do... | 0.6 | 0 | 0.5 | ...do... | 100 | 20 | 24 | 11.0 | 98.5 | 0.2 | 1.3 | 2.0 |
| 10 | CH$_3$COOH | 0.32 | Triethyl aluminum | 1.2 | 0 | 0.5 | ...do... | 100 | 20 | 5 | 19 | 98.5 | 0.2 | 1.3 | 2.5 |
| 11 | CH$_3$COOH | 0.33 | Diethyl aluminum chloride | 1.2 | 0 | 0.5 | ...do... | 100 | 20 | 6 | 27 | 90.6 | 7.0 | 2.4 | 0.2 |
| 12 | CH$_3$COOH | 0.38 | Diethyl zinc | 2.0 | 0 | 0.5 | ...do... | 100 | 20 | 100 | 9 | 99.4 | 0.5 | 0.1 | 1.0 |
| 13 | CH$_3$COOH | 0.34 | Triisobutyl aluminum | 1.2 | 0 | 0.5 | Ligroin | 100 | 20 | 2 | 9 | 98.6 | 0.1 | 1.3 | 2.3 |
| 14 | CH$_3$COOH | 0.34 | ...do... | 1.2 | 0 | 0.5 | n-Heptane | 100 | 20 | 2 | 27 | 98.5 | 0.2 | 1.3 | 2.4 |
| 15 | CH$_3$COOH | 0.34 | ...do... | 1.2 | 0 | 0.5 | Methyl cyclohexane | 100 | 20 | 2 | 21 | 98.6 | 0.3 | 1.1 | 2.2 |
| 16 | CH$_3$COOH | 0.77 | ...do... | 2.0 | 31.6 | 0.5 | Toluene | 110 | 20 | 28 | 11 | 97.5 | 0.5 | 2.0 | 1.8 |
| 17 | CH$_3$COOH | 0.12 | ...do... | 0.45 | 0.6 | 0.5 | ...do... | 100 | 20 | 7 | 19 | 99.0 | 0.2 | 0.8 | 3.0 |
| 18 | CH$_3$COOH | 0.11 | Tridecyl aluminum | 0.4 | 0.6 | 0.5 | ...do... | 100 | 20 | 7 | 17 | 98.7 | 0.3 | 1.0 | 2.5 |
| 19* | Isobutyl alcohol | 0.10 | Triisobutyl aluminum | 0.28 | 0.75 | 0.38 | ...do... | 132 | 10 | 6 | 55 | 99.1 | | | |
| 20* | ...do... | 0.10 | ...do... | 0.28 | 0.75 | 0.38 | ...do... | 132 | 20 | 4 | 70 | 99.5 | | | |
| 21* | ...do... | 0.10 | ...do... | 0.28 | 0.75 | 0.38 | ...do... | 132 | 30 | 2 | 70 | 99.4 | | | |
| 22* | ...do... | 0.10 | ...do... | 0.28 | 0.75 | 0.38 | ...do... | 132 | 40 | 2 | 76 | 99.2 | | | |

*The complex compound of the tetrafluoroborate of nickel utilized in example 5 is soluble in a solvent.

The organic complex compound of the tetrafluoroborate of nickel utilized in examples 3 through 8 were prepared by treating crystalline tetrafluoroborate of nickel Ni(BF$_4$)$_2$·6H$_2$O with acetone dimethyl acetal, or ethyl orthoformate, isobutyl orthoformate, acetic acid anhydride, trichloroacetic acid lauric acid anhydride, respectively, while the complex compound utilized in example 9 was prepared by treating the acetic acid substituted compound with acetyl aceton. The quantity of 1,3-butadiene added identified by a symbol ① shows the quantity of 1,3-butadiene added for the purpose of increasing the acivity of the catalyst prior to the incorporation of the organometallic compound of the metals of groups 2 and 3 into the tetrafluoroborate of nickel or cobalt to prepare the catalyst while the quantity identified by a symbol ② represents the quantity of 1,3-butadiene which was incorporated at the time of effecting the polymerization reaction. In example 16 only the upper clear liquid of the prepared catalyst-toluene solution was used as the liquid catalyst.

EXAMPLE 23

The tetrafluoroborate of cobalt Co (BF$_4$)$_2$ utilized in example 2 was treated with acetic acid anhydride to form a compound wherein the water of crystallization was replaced by acetic acid. 0.35 millimol of this compound was dispersed in 100 ml of toluene, and 1.4 millimols of triisobutyl aluminum and 0.4 mol of isoprene were successively added. The mixture was polymerized for 24 hours to obtain rubbery polyisoprene at a yield of 14 percent. The polymer showed about 80 percent of 3.4 structure.

EXAMPLE 24

Commercial crystalline tetrafluoroborate of cobalt Co(BF$_4$)$_2$·6H$_2$O was treated with isobutyl orthoformate ( CH(Oi—C$_4$H$_9$)$_3$ ) to obtain Co(BF$_4$)$_2$ · 6i—C$_4$H$_9$OH. 0.13 millimol of this compound was dissolved in 80 ml of toluene and 1.04 of millimols of butadiene was added to the solution followed by the addition of 0.78 millimol of diethyl aluminum chloride to obtain a liquid catalyst. 0.4 mol of butadiene was then added to the liquid catalyst and polymerized at a temperature of 20° C. for 37 minutes to obtain rubbery polybutadiene at a yield of 64 percent. The microstructure of the polybutadiene was: 90.6 percent of cis-1,4, 0.5 percent of trans-1,4 and 8.9 percent of vinyl. The intrinsic viscosity [η] in toluene was 0.8.

EXAMPLE 25

0.01 millimol of Co(BF$_4$)$_2$ · 6i—C$_4$H$_9$OH was dissolved in 80 ml of toluene. 5 millimols of butadiene were incorporated to the solution and then 5 millimols of diethyl aluminum chloride was incorporated to prepare a liquid catalyst. 0.376 mole of butadiene was incorporated into the liquid catalyst and polymerized at a temperature of 20° C. for 20 minutes to obtain rubbery butadiene at a yield of 21 percent. The microstructure of the polybutadiene was: 98.9 percent of cis-1,4, 0.1 percent of trans 1,4 and 1.0 percent of vinyl. The intrinsic viscosity [η] in toluene at 30° C. was 38.

EXAMPLE 26

0.35 millimol of the acetic acid substituted compound utilized in example 23 was dispersed in 100 ml of toluene. 1.4 millimols of triisobutyl aluminum were incorporated to the disperse system and thereafter 0.44 mol of butadiene and 0.05 mol of isoprene were added. The mixture was polymerized at a temperature of 20° C. for 24 hours to obtain a rubbery polymer at a yield of 5.3 percent. Analysis of the polymer by infrared absorption spectroscopy showed that the polybutadiene had a microstructure consisting of 42.4 percent of cis-1,4 7.0 percent of trans -1,4 and 50.6 percent of vinyl and that the microstructure of the isoprene mainly consisted of 3.4 structure.

EXAMPLE 27

The polybutadiene obtained in example 17 was cured under the following curing conditions and the physical characteristics of the cured rubber were measured as shown in table 2 below. For comparison, commercial polybutadiene was cured similarly and the physical characteristics of the resulted rubber are also shown in table 2.

Curing conditions.

| | Parts, by weight |
|---|---|
| polybutadiene | 100 |
| sulfur | 1.5 |
| stearic acid | 3 |
| curing accelerator (MSA) | 1 |
| carbon black (SH) | 50 |

These components were added in the order mentioned. After kneading with rolls at 50° C., the mixture was cured at a temperature of 145° C. for 30 minutes.

perature of 50° C., the yield of polymerization was measured. The intrinsic viscosity was also measured in toluene at 30° C. The results are shown in Table III.

TABLE III

| Ex. | Butadiene (mol) | Isoprene (mol) | Butadiene/ isoprene (molar ratio) | Reaction time (hrs.) | Yield of polymer wt. percent) | Content of isoprene * (mol percent) | $[\eta]$, 30° C. toluene |
|---|---|---|---|---|---|---|---|
| 29 | 0.504 | 0 | 10.0/0 | 1.0 | 72.5 | 0 | 4.5 |
| 30 | 0.478 | 0.026 | 9.48/0.52 | 4.0 | 75.4 | 4.0 | 3.1 |
| 31 | 0.441 | 0.063 | 8.75/1.25 | 4.0 | 50.5 | 5.9 | 2.7 |
| 32 | 0.416 | 0.088 | 8.25/1.75 | 4.0 | 27.4 | 11.0 | 2.3 |
| 33 | 0.378 | 0.126 | 7.50/2.50 | 4.0 | 19.3 | 14.7 | 1.6 |
| 34 | 0.315 | 0.189 | 6.05/3.95 | 4.0 | 5.4 | 23.1 | 1.0 |
| 35 | 0.252 | 0.252 | 5.00/5.00 | 55 | 34.2 | 40.4 | 0.7 |
| 36 | 0.189 | 0.315 | 3.75/6.25 | 55 | 22.1 | 50.0 | 0.6 |

*The content of isoprene in the polymer of each example was measured by using a calibration curve showing the contents of isoprene and butadiene which were determined by the ratio D7.25/D13.6 of the degree of absorption of the copolymers at wavelengths of 7.25 $\mu$ and 13.6 $\mu$ by means of infrared absorbtion spetroscopy.

TABLE II

Characteristics of the rubber

| Items measured | Novel polybutadiene | Commercial polybutadiene |
|---|---|---|
| Mooney viscosity of raw material (ML) | 40.0 | 42.5 |
| Mooney viscosity of compound (ML) | 103.5 | 106.5 |
| Hardness (HS) | 64 | 66 |
| Modulus (kg/cm$^2$) at 300 % | 142 | 148 |
| Tensile strength (Kg/cm$^2$) | 223 | 216 |
| Elongation (%) | 445 | 415 |
| Acron Abrasion (%) | 0.054 | 0.038 |
| Pico Abrasion (%) | 270 | 268 |
| Rebound (%) | 60.5 | 62.5 |

Table II shows that the polybutadiene rubber prepared by the process of this invention manifests desirable characteristics comparable with those of commercial polybutadiene rubber.

EXAMPLE 28

0.15 millimol of Ni(BF$_4$)$_2$·b6 iso—C$_4$I$_9$OH containing the isobutyl alcohol and utilized in example 5 as a ligand was dissolved in 180 ml of toluene.

0.71 millimol of butadiene and then 0.43 millimol of triisobutyl aluminum were added to the solution to prepare a liquid catalyst. 3.0 mols of butadiene was incorporated to the liquid catalyst and polymerized at a temperature of 20° C. for 4 hours to obtain rubbery polybutadiene at a yield of 27.3 percent. The microstructure of this polymer was: 99.6 percent of cis-1,4, 0.1 percent of trans-1,4 and 0.3 percent of vinyl and the intrinsic viscosity [$\eta$] was 3 %.

EXAMPLES 29 – 36

50 m of dehydrated toluene and 0.15 millimol of a compound wherein the water of crystallization of tetrafluroborate of nickel was substituted by isobutyl alcohol were charged in a pressure tight glass bottle having an inner volume of 340 ml to dissolve the compound in toluene. To this solution were successively added 1.10 millimols of isoprene and 0.425 millimole of triisobutyl aluminum to prepare a liquid catalyst. Monomers containing butadiene and isoprene at various molar ratios as shown in the following table III were added to the liquid catalyst. Each sample was reacted at a temperature of 20° C. for various times as shown in table III.

After the polymerization reaction each content of the pressure tight bottle was poured in a methanol - toluene mixture containing 2 percent of ionol (3.5-ditertiary butyl hydroxytoluene) acting as an anti-oxidant to precipitate a rubbery polymer. After being dried under reduced pressure at a tem-

*The content of isoprene in the polymer of each example was measured by using a calibration curve showing the contents of isoprene and butadiene which were determined by the ratio D7.25/D13.6 of the degree of absorption of the copolymers at wavelengths of 7.25 $\mu$ and 13.6 $\mu$ by means of infrared absorption spetroscopy.

Table IV shows the results of measurement of the microstructure of the polymers of these examples. In this regard, the polybutadiene component was measured by the Morero method while the polyisoprene component by the Richardson method (J. Poly. Sci. 10, 353 (1953)).

TABLE IV

| Example | Butadiene component (%) | | | Isoprene component (%) | |
|---|---|---|---|---|---|
| | Cis-1,4 | Trans-1.4 | Vinyl | 1.4 | 3.4 |
| 29 | 99.3 | 0.3 | 0.4 | — | — |
| 30 | 99.7 | 0.1 | 0.2 | 100 | 0 |
| 31 | 99.4 | 0.1 | 0.5 | 100 | 0 |
| 32 | 98.7 | 0.7 | 0.6 | 100 | 0 |
| 33 | 97.5 | 1.5 | 1.0 | 100 | 0 |
| 34 | 94.8 | 3.3 | 1.9 | 95.5 | 4.5 |
| 35 | 89.8 | 6.9 | 3.3 | 96.7 | 3.3 |
| 36 | 85.0 | 9.4 | 5.6 | 79.0 | 21.0 |

As can be noted from this table when the novel catalysts are used and when suitable conditions of polymerization are selected the butadiene compound of the copolymer mainly comprises the cis 1,4 polymerization structure and the isoprene component also comprises the 1,4 polymerization structure (mainly of the cis structure).

Thus, it is possible to obtain copolymers having desirable physical characteristics of both polybutadiene and polyisoprene. The activity of the catalyst is very high. Although the desired polymerization activity can be provided at any molar ratio of butadiene and isoprene it is to be understood that the activity increases with the content of butadiene.

EXAMPLES 37 – 44

50 ml of dehydrated toluene and 0.01 millimol of a compound wherein the water of crystallization of tetrafluoroborate of cobalt was substituted by isobutyl alcohol were charged in a pressure tight glass bottle having an inner volume of 340 ml to dissolve the compound in toluene. To this solution were added 0.10 millimol of isoprene and then 1.0 millimol of diethyl aluminum chloride to prepare a liquid catalyst. Monomers containing butadiene and isoprene at various molar ratios as shown in the following table V were added to the liquid catalyst. Each sample was reacted at a temperature of 20° C. for 4 hours. Post treatments of the polymers were carried out in the same manner as in examples 29 through 36.

TABLE V

| Ex. | Butadiene (mols) | Isoprene (mol) | Butadiene/ isoprene (molar ratio) | Yield of polymer (percent) | Isoprene content (molar percent) | $[\eta]$, 30° C. toluene |
|---|---|---|---|---|---|---|
| 37 | 10.0 | 0 | 10.0/0 | 27.2 | 0 | 1.0 |
| 38 | 0.478 | 0.026 | 9.48/0.52 | 41.7 | 4.3 | 1.1 |
| 39 | 0.441 | 0.063 | 8.75/1.25 | 34.9 | 10.8 | 1.1 |
| 40 | 0.416 | 0.088 | 8.25/1.75 | 25.5 | 15.3 | 1.0 |
| 41 | 0.378 | 0.126 | 7.50/2.50 | 25.2 | 25.7 | 0.8 |
| 42 | 0.315 | 0.189 | 6.05/3.95 | 23.7 | 40.1 | 0.7 |
| 43 | 0.252 | 0.252 | 5.00/5.00 | 20.9 | 46.5 | 0.8 |
| 44 | 0.187 | 0.315 | 3.75/6.25 | 20.9 | 62.4 | 1.0 |

The results of measurement of the microstructure of the copolymers of these examples are shown in table VI.

TABLE VI

| Example | Butadiene component (%) Cis-1,4 | Trans-1.4 | Vinyl | Isoprene components (%) 1.4 | 3.4 |
|---|---|---|---|---|---|
| 37 | 84.6 | 0.2 | 15.2 | — | — |
| 38 | 85.0 | 0.2 | 14.8 | 66.7 | 33.3 |
| 39 | 80.4 | 0.2 | 19.4 | 66.7 | 33.3 |
| 40 | 82.4 | 0.3 | 17.3 | 50.0 | 50.0 |
| 41 | 67.1 | 0.2 | 32.7 | 33.3 | 66.7 |
| 42 | 50.5 | 0.4 | 49.1 | 20.7 | 79.3 |
| 43 | 37.1 | 0.4 | 62.5 | 11.8 | 88.2 |
| 44 | 24.7 | 0.6 | 74.7 | 7.5 | 92.5 |

EXAMPLES 45 – 52

A compound wherein the water of crystallization of tetrafluoroborate of nickel was substituted by ethyl alcohol, isobutyl alcohol, acetic acid or acetyl acetone was used. Further ligroin, n-heptane, and methylcyclohexane were used as the catalyst and triethyl aluminum and diethyl zinc were used as the reducing reagents for the copolymerization reaction of butadiene-isoprene.

Polymerization reactions were carried out at 20° C. and for different periods under the same conditions as in example, 29 – 36 except that the molar ratio of butadiene and isoprene was selected to be 8.75/1.25. The results are shown in table VII.

the mixture to prepare a liquid catalyst. Varying amount of dehydrated 1-vinyl cyclohexane-3 was added to the liquid catalyst followed by the addition of 0.252 mol of 1,3-butadiene. After sealing, the bottle was rotated in a water bath maintained at 40° C. for 2 hours to effect polymerization. After completion of the polymerization, the reaction mixture was poured into a mixture of methanol and toluene containing 2 percent of 3,5-ditertiary butylhydroxy toluene (anti-oxidant) to precipitate rubbery polybutadiene. The resulted polybutadiene was dried at a temperature of 50° C. under reduced pressure and the yield of polymerization was measured. Table VIII shows the results.

TABLE VIII

| Ex. | 1-vinyl-cyclo-hexane-3 (millimols) | Yield of polymeri-zation (wt. percent) | $[\eta]$, 30° toluene | Percent Cis-1.4 | Trans-1.4 | Vinyl |
|---|---|---|---|---|---|---|
| 53 | 2.0 | 78.0 | 2.2 | 99.2 | 0.2 | 0.6 |
| 54 | 1.5 | 79.4 | 2.5 | 99.3 | 0.1 | 0.6 |
| 55 | 1.0 | 80.9 | 2.9 | 99.2 | 0.2 | 0.6 |
| 56 | 0.50 | 78.7 | 3.2 | 99.1 | 0.2 | 0.7 |
| 57 | 0.20 | 83.1 | 3.3 | 99.3 | 0.1 | 0.6 |
| 58 | 0.10 | 82.1 | 3.3 | 99.2 | 0.2 | 0.6 |
| 59 | 0.05 | 88.0 | 3.5 | 99.2 | 0.2 | 0.6 |
| 60 | 0 | 94.2 | 3.8 | 99.2 | 0.1 | 0.6 |

Intrinsic viscosity $[\eta]$ was measured in toluene maintained at 30° C., and the microstructure of the polymer was measured by the infrared absorbption spectroscopy(i.e. above described Moreo method). No gel was noted in the resulted polymers.

EXAMPLE 61

80 ml of dehydrated n-heptane, 0.01 millimol of an ethyl alcohol complex compound of tetrafluoroborate of cobalt $Co(BF_4)_2 \cdot 6C_2H_5OH$ and 5 millimols of 1,3-butadiene were charged in a pressure tight glass bottle having an inner volume of 340 ml under nitrogen or argon atmosphere. Thereafter 5 millimols of diethyl aluminum chloride were added to the mixture to prepare a liquid catalyst. 2.0 millimols of dehydrated 1-vinyl cyclohexene-3 were added to the liquid catalyst followed by the addition of 0.3776mol of 1,3-butadiene. After sealing, the bottle was rotated in a water bath at 20° C. for 30 minutes to obtain rubbery polybutafiene at an yield of 42 percent. The

TABLE VII

| Example | Ni(RF$_4$)$_2$.6X Type of X | Milli-mol | Reducing agent | Milli-mol | Solvent | Reaction time (hrs.) | Yield of polymer (wt. percent) | Content of isoprene (mol percent) | $[\eta]$ 30° C. toluene |
|---|---|---|---|---|---|---|---|---|---|
| 45 | C$_2$H$_5$CH | 0.15 | Tributyl aluminum | 0.43 | Toluene | 4.0 | 45 | 5.8 | 2.5 |
| 46 | i C$_4$H$_9$OH | 0.15 | do | 0.43 | Ligroin | 4.0 | 20 | 5.9 | 2.1 |
| 47 | i C$_4$H$_9$OH | 0.15 | do | 0.43 | n-Heptane | 6.0 | 30 | 6.0 | 2.2 |
| 48 | i C$_4$H$_9$OH | 0.15 | do | 0.43 | Methyl dicyclohexane | 5.0 | 50 | 5.5 | 2.4 |
| 49 | CH$_3$COOH | 0.3 | do | 1.0 | Toluene | 15 | 20 | 3.5 | 2.0 |
| 50 | Acetyl acetone | 0.4 | do | 1.2 | do | 20 | 15 | 4.0 | 1.5 |
| 51 | i C$_4$H$_9$OH | 0.15 | Triethyl aluminum | 0.43 | do | 4.0 | 32 | 5.6 | 2.2 |
| 52 | i C$_4$H$_9$OH | 0.15 | Diethyl zinc | 0.43 | do | 50 | 10 | 5.0 | 1.1 |

Copolymerization of butadiene and isoprene may be effected either by the single step process wherein monomers thereof are admixed and then the mixture is polymerized or by the two step process wherein either butadiene or isoprprene is first polymerized and then the remaining monomer is copolymerized. Both processes resulted in high quality copolymers.

EXAMPLES 53 – 60

89 ml of dehydrated toluene, 0.05 millimol of an isobutyl alcohol complex compound of tetrafluoroborate of nickel Ni(BF$_4$)$_2$ 6 i C$_4$H$_9$OH and 2.5 millimols of 1.3 - butadiene were charged in a pressure tight glass bottle having an inner volume of 340 ml under dry nitrogen or argon atmosphere. Then 0.125 millimol of triethyl aluminum was incorporated in intrinsic viscosity $[\eta]$ of the polymer in toluene maintained at a temperature of 30° C. was 2.5 and the microstructure was: 98.9 percent of cis-1,4 0.1 percent of trans-1,4 and 1.0 percent of vinyl.

A control prepared without the addition of 1-vinyl cyclohexene showed a yield of 45 percent, $[\eta]$ of 3.8 and a microstructure consisting of 98.8 percent of cis-1,4 0.2% of trans-1.4 and 1.0 percent of vinyl.

EXAMPLE 62

39 ml of dehydrated toluene, 1.0 millimol of limonene, 0.04 millimol of an acetic acid complex compound of tetrafluoroborate of cobalt $Co(BF_4)_2 \cdot 6CH_3COOH$ and 0.4 millimol of isoprene were charged in a pressure tight bottle having an inner volume of 340 ml under nitrogen or argon atmosphere. Then 4 millimols of diethyl aluminum chloride were added to the mixture to prepare a liquid catalyst. After incorporation of 0.15 mol of isoprene the bottle was sealed and rotated in a water bath at 20° C. for 3 hours to obtain polymerized rubbery polyisoprene at a yield of 40 percent. The intrinsic viscosity [$\eta$] in toluene at 30° C. was 1.8. A control prepared without the addition of limonene showed a polymerization yield of 42 percent and a [$\eta$] of 23.

EXAMPLES 63 – 70

89 ml of dehydrated toluene, 0.05 milimol of an isobutyl alcohol complex compound of tetrafluoroborate of nickel Ni (BF$_4$)$_2$· 6i—C$_4$H$_9$OH and 2.5 milimol of 1.3-butadiene were charged in a glass bottle identical to that of the previous example under dry nitrogen atmosphere. Thereafter, 0.125 milimol of triethyl aluminum was added to the mixture to prepare a liquid catalyst. Varying amounts of dehydrated 1-butene and 0.252 mol of 1,3-butadiene were added to the liquid catalyst. After sealing, the bottle was rotated in a water bath maintained at 40° C. for 2 hours to effect polymerization. After completion of the reaction, the reaction mixture was poured into a mixture of methanol and toluene containing 2 percent of 3.5-ditertiary butylhydroxytoluene (anti-oxidant) to precipitate rubbery polybutadiene. The polymer was dried at a temperature of 50° C. to measure the yield of the polymer. The results are shown in table IX.

TABLE IX

| Example | 1-butene millimol | Yield of polymer (wt. %) | [$\eta$] 30° C. toluene |
|---|---|---|---|
| 63 | 160 | 78.8 | 1.2 |
| 64 | 120 | 74.2 | 1.3 |
| 65 | 100 | 75.0 | 1.5 |
| 66 | 80 | 79.3 | 2.2 |
| 67 | 60 | 78.0 | 2.5 |
| 68 | 40 | 78.8 | 2.8 |
| 69 | 20 | 77.2 | 3.1 |
| 70 | 0 | 78.8 | 3.7 |

EXAMPLE 71

100 ml of dehydrated toluene, 0.04 millimol of isobuthyl alcohol complex compound of tetrafluoroborate of nickel Ni(BF$_4$)$_2$ 6 i—C$_4$H$_9$OH and 2.0 millimols of 1,3-butadiene were charged in a pressure tight glass bottle having an inner volume of 340 ml and then 0.08 millimol of triethyl aluminum was added to the mixture to prepare a liquid catalyst. 37 g of distilled styrene and 14 g of dehydrated 1,3-butadiene were incorporated into the liquid catalyst. After sealing, the bottle was rotated to stir its content in a water bath maintained at 40° C. for 50 hours to effect polymerization. After the polymerization reaction, a large quantity of methanol containing 2 percent of 3,5-ditertiary butyl hydroxytoluene (anti-oxidant) was poured into the reaction mixture to precipitate the resulted polymer.

10.9 g of the polymer was obtained. The intrinsic viscosity in toluene at 30° C. was 0.53, and the microstructure of the butadiene component was: 94.9 percent-cis-1,4, 3.6 percent of trans-1,4 and 1.5 percent of vinyl. A calibration curve was plotted from the absorption of infrared absorption spectruum of butadiene at 737 cm$^{-1}$ and that of styrene at 700 cm$^{-1}$. From this curve the quantity of styrene in the polymer was determined to be 12 percent, by weight. To determine whether this styrene component was copolymerized with butadiene or not, the polymer was dispersed in n-hexane whereby to extract styrene polymer with dimethyl formamide. However, no styrene polymer was extracted which showed that all styrene component was copolymerized completely with the butadiene component.

Thus, this invention provides a novel polymerization catalyst for polymerizing conjugated dienes such as butadiene, isoprene etc., said catalyst consisting of tetrafluoroborate of nickel or cobalt or a complex compound thereof and an organometallic compound of a metal groups 2 or 3 of the periodic table which can be prepared readily and manifests high activity even at relatively low temperatures.

Polymers and copolymers prepared by utilizing the novel catalyst contain high percentage of cis content and have good workability.

We claim:

1. A process of polymerizing a conjugated diene comprising the step of polymerizing said conjugated diene at a temperature ranging from —20° to 150° C. by using a polymerization catalyst comprising at least one tetrafluoroborate selected from the complex compounds of tetrafluoroborates expressed by the formula M(BF$_4$)$_2$ · 6X wherein M is a member selected from the group consisting of nickel and cobalt and X is selected from the group consisting of alcohols, carboxylic acids, phenols, amines, amides and compounds which replace the water of crystallization containing active hydrogen atoms, said tetrafluoroborate being used at a molar ratio of from 10$^6$ to 0.5 with respect to said conjugated diene, and from 0.01 to 2,000 moles, based on said tetrafluoroborate, of an organometallic compound of a metal selected from the group consisting of metals of groups II and III of the periodic table.

2. The process according to claim 1 wherein said conjugated diene is at least a member selected from the group consisting of butadiene and isoprene.

3. A process of polymerizing a conjugated diene which comprises contacting, at a temperature of from —20° C to 150° C. a monomeric hydrocarbon material containing at least a significant proportion of a conjugated diene with a catalyst formed by admixing from 10$^{-6}$ to 0.5 mole, based on the quantity of said conjugated diene, of at least one metal tetrafluoroborate selected from the complex compounds of tetrafluoroborate expressed by the formula M(BF$_4$)$_2$ · 6X wherein M is a member selected from the group consisting of nickel and cobalt and X is selected from the group consisting of alcohols, carboxylic acids, phenols, amines, amides and compounds which replace the water of crystallization containing active hydrogen atoms and from 0.01 to 2,000 moles, based on the quantity of said metal fluoroborate, of an organometallic compound of a metal of groups II and III of the periodic table.

4. The process according to claim 3 wherein the monomeric hydrocarbon material is brought into contact with the catalyst in the presence of an inert solvent selected from the group consisting of aliphatic hydrocarbons, aliphatic cyclohydrocarbons, aromatic hydrocarbons and hydrocarbon mixtures.

5. The process according to claim 3 wherein the monomeric hydrocarbon material consists entirely of conjugated diene.

6. The process according to claim 3 wherein the monomeric hydrocarbon material contains at least a significant proportion of butadiene-1,3.

7. The process according to claim 3 wherein the monomeric hydrocarbon material consists of a mixture of a conjugated diene and vinyl substituted aromatic hydrocarbon.

8. The process according to claim 3 wherein the monomeric hydrocarbon material consists of a mixture of a conjugated diene and vinyl cycloolefine.

9. A catalyst for effecting the polymerization reaction of a conjugated diene, consisting essentially of at least one member selected from the complex compounds of tetrafluoroborates expressed by the formula M(BF$_4$)$_2$·6X wherein M is a member selected from the group consisting of nickel and cobalt and X is selected from the group consisting of alcohols, carboxylic acids, phenols, amines, amides and compounds which replace the water of crystallization containing active hydrogen atoms, and from 0.01 to 2,000 moles, based on the quantity of the metal fluoroborate, of an organometallic compound of a metal selected from the group consisting of groups II and III of the periodic table.

10. The catalyst according to claim 9 wherein said complex compound is a compound wherein a portion or all of the water of crystallization of the tetrafluoroborate is substituted by at least a compound selected from the group consisting of alcohols, carboxylic acids, amines, amides, phenols and compounds containing active hydrogen.

11. A catalyst for effecting the polymerization reaction of a conjugated diene, consisting essentially of at least one tetrafluoroborate corresponding to the formula $M(BF_4)_2 \cdot 6X$, wherein M is nickel or cobalt, X is selected from the group consisting of alcohols, carboxylic acids, phenols, amines, amides and other compounds which replace the water of crystallization containing active hydrogen, and from 0.01 to 2,000 moles, based on the quantity of the metal fluoroborate, of an organometallic compound corresponding to the formula $R_mMY_n$ wherein R is an aklyl radical having one to 20 carbon atoms, M is zinc or aluminum, Y is a halogen having an atomic weight of at least 35, $m$ is 1 to 3, $n$ is 0 to 2 and $m+n$ is equal to the valence of m.

12. The catalyst according to claim 11 wherein said organometallic compound is trialkylaluminum.

13. The catalyst according to claim 12 in which X is ROH, wherein R is alkyl radical having one to 20 carbon atoms.

14. A process according to claim 1 wherein the organometallic compound corresponds to the formula $R_mMY_n$ in which R is an alkyl radical having one to 20 carbon atoms, M is zinc or aluminum, Y is a halogen having an atomic weight of at least 35, $m$ is 1 to 3, $n$ is 0 to 2 and $m + n$ is equal to the valence of M.

15. A process according to claim 14 wherein the organometallic compound is trialkyl aluminum.

16. A process according to claim 1 wherein the complex compounds of said tetrafluoroborates are selected from the groups consisting of the complex compounds of alcohol and carboxylic acid.

17. A process according to claim 3 wherein the complex compounds of said tetrafluoroborates are selected from the group consisting of the complex compounds of alcohol and carboxylic acid.

18. A catalyst according to claim 11 wherein X is a carboxylic acid of the formula RCOOH wherein R is an alkyl radical having one to 20 carbon atoms.

19. A catalyst according to claim 11 wherein X is an amine selected from the group consisting of methyl amine, ethyl amine, diethyl amine, triethyl amine, ethanol amine, pyridine and aniline.

* * * * *